United States Patent
Jensen et al.

(10) Patent No.: US 10,697,939 B2
(45) Date of Patent: Jun. 30, 2020

(54) SYNTHETIC FINE-PITCH ULTRASOUND IMAGING

(71) Applicant: B-K Medical Aps, Herlev (DK)

(72) Inventors: Henrik Jensen, Nordhavn (DK); Fredrik Gran, Limhamn (SE); Jens Munk Hansen, Copenhagen N (DK)

(73) Assignee: B-K Medical Aps, Herlev (DK)

( * ) Notice: Subject to any disclaimer, the term of this patent is extended or adjusted under 35 U.S.C. 154(b) by 167 days.

(21) Appl. No.: 15/910,115

(22) Filed: Mar. 2, 2018

(65) Prior Publication Data

US 2019/0271667 A1 Sep. 5, 2019

(51) Int. Cl.
*G01N 29/265* (2006.01)
*G01N 29/24* (2006.01)

(52) U.S. Cl.
CPC ........... *G01N 29/265* (2013.01); *G01N 29/24* (2013.01)

(58) Field of Classification Search
CPC .. G01N 29/265; G01N 29/24; G01S 15/8927; G01S 15/8915; G01S 15/8918
See application file for complete search history.

(56) References Cited

U.S. PATENT DOCUMENTS

| | | | |
|---|---|---|---|
| 5,520,184 A * | 5/1996 | Ri | G01S 7/52046 600/437 |
| 5,902,241 A * | 5/1999 | Seyed-Bolorforosh | G01S 7/52046 600/443 |
| 6,689,063 B1 * | 2/2004 | Jensen | G01S 7/52046 600/443 |
| 7,064,822 B2 * | 6/2006 | Borden | G01N 21/171 356/237.4 |
| 2003/0060715 A1 * | 3/2003 | Sato | G10K 11/02 600/459 |
| 2004/0011134 A1 * | 1/2004 | Sato | B06B 1/064 73/632 |
| 2005/0056787 A1 * | 3/2005 | Cong | G01N 21/0303 250/343 |
| 2005/0096539 A1 * | 5/2005 | Leibig | A61B 8/00 600/437 |
| 2008/0106976 A1 * | 5/2008 | Davidsen | B06B 1/0622 367/140 |
| 2008/0110261 A1 * | 5/2008 | Randall | A61B 8/00 73/592 |

(Continued)

*Primary Examiner* — Helen C Kwok
(74) *Attorney, Agent, or Firm* — Anthony M. Del Zoppo, III; Daugherty & Del Zoppo Co., LPA

(57) ABSTRACT

An ultrasound imaging system includes an imaging probe including an array with a plurality of elements and a drive system configured to move the transducer array with a first pitch during data acquisition. A console includes a transmit circuit configured to excite the elements to transmit a first sequence of different sub-sets of the elements and then a second sequence, wherein the plurality of elements is offset from each other by a predetermined shift for the sequences. The console further includes a receive circuit configured to receive echo signals from the elements for the sequences. The console further includes a processor configured to beamform the received signals for the sequences and generate scanlines for the sequences and configured to combine pairs of scanlines across the sequences to produce a single sequence with a second pitch that is less than the first pitch.

20 Claims, 3 Drawing Sheets

(56) References Cited

U.S. PATENT DOCUMENTS

| | | | |
|---|---|---|---|
| 2008/0130415 A1* | 6/2008 | Tai | B06B 1/0622 |
| | | | 367/140 |
| 2008/0273424 A1* | 11/2008 | Wodnicki | A61B 8/0833 |
| | | | 367/180 |
| 2010/0156243 A1* | 6/2010 | Weekamp | H01L 25/16 |
| | | | 310/334 |
| 2010/0317972 A1* | 12/2010 | Baumgartner | B06B 1/0622 |
| | | | 367/135 |
| 2011/0046484 A1* | 2/2011 | Adams | A61B 8/5269 |
| 2013/0201798 A1* | 8/2013 | Jensen | A61B 8/4488 |
| 2015/0338511 A1* | 11/2015 | Savord | B06B 1/0622 |
| | | | 367/135 |
| 2015/0369916 A1 | 12/2015 | Nikolov et al. | |
| 2017/0164835 A1* | 6/2017 | Wiest | A61B 8/5269 |
| 2018/0098750 A1* | 4/2018 | Haider | A61B 8/4488 |

* cited by examiner

SYNTHETIC FINE-PITCH ULTRASOUND IMAGING

TECHNICAL FIELD

The following generally relates to ultrasound imaging and more particularly to synthetic fine-pitch ultrasound imaging.

BACKGROUND

Ultrasound (US) imaging has provided useful information about the interior characteristics of an object or subject under examination. A general US imaging system includes at least a transducer array with a plurality of transducer elements. When scanning with a pitch (center-to-center distance between elements) greater than half a wavelength, grating lobes will occur. Grating lobes are caused by sound energy that spreads out from the transducer at angles other than the primary path. These unwanted ray paths can reflect off surfaces and cause spurious indications on an image. One approach to mitigating grating lobes is to reduce the pitch to less than half a wavelength. However, to reduce the pitch for a given transducer aperture, more elements and hence transmit and receive channels are required, and, unfortunately, this increases overall transducer cost, and complexity.

SUMMARY

Aspects of the application address the above matters, and others.

In one aspect, an ultrasound imaging system includes an imaging probe and a console. The imaging probe includes a transducer array with a plurality of elements and a drive system configured to move the transducer array with a first pitch during data acquisition The console includes a transmit circuit configured to excite the plurality of elements to transmit a first sequence of different sub-sets of the elements and then a second sequence of the different sub-sets of the elements, wherein the plurality of elements are offset from each other by a predetermined shift for the first and second sequences, The console further includes a receive circuit configured to receive echo signals from the plurality of elements for the first and second sequences. The console further includes a processor configured to beamform the received signals for the first and second sequences and generate scanlines for the first and second sequences, and configured to combine pairs of scanlines across the first and second sequences to produce a single sequence with a second pitch that is less than the first pitch.

In another aspect, a method includes moving a transducer array with a plurality of elements with a first pitch during data acquisition, transmitting a first sequence of different sub-sets of the elements and then transmitting a second sequence of the same different sub-sets of the elements, wherein the plurality of elements are offset from each other by a predetermined shift for the first and second sequences, receiving signals in response to the transmission sequences, beamforming the received signals for the first and second sequences to generate scanlines, and combining pairs of scanlines across the first and second sequences to produce a single sequence with a second pitch that is less than the first pitch.

In another aspect, a computer readable medium encoded with computer readable instruction which when executed by a processor causes the processor to: move a transducer array with a plurality of elements with a first pitch during data acquisition, transmit a first sequence of different sub-sets of the elements, and then a second sequence of the different sub-sets of the elements; wherein the plurality of elements is offset from each other by a predetermined shift for the first and second sequences, receive signals in response to the first and second sequences, beamform the received signals for the first and second sequences to generate scanlines for the first and second sequences, and combine pairs of scanlines across the first and second sequences to produce a single sequence from the first and second sequences with a second pitch that is less than the first pitch.

Those skilled in the art will recognize still other aspects of the present application upon reading and understanding the attached description.

BRIEF DESCRIPTION OF THE DRAWINGS

The application is illustrated by way of example and not limitation in the figures of the accompanying drawings, in which like references indicate similar elements and in which.

DETAILED DESCRIPTION

The following describes an approach for acquiring overlapping apertures at a first pitch by rotating an ultrasound transducer array during data acquisition and combining the overlapping apertures to produce an aperture at a second smaller pitch. In one instance, an offset between the apertures is half the pitch in the sense that the element sensitivity has a zero in the angle of the grating lobe. As a result, a finer pitch is obtained without requiring additional elements, transmit channels and/or receive channels, and/or grating lobes are mitigated.

Figure 1:
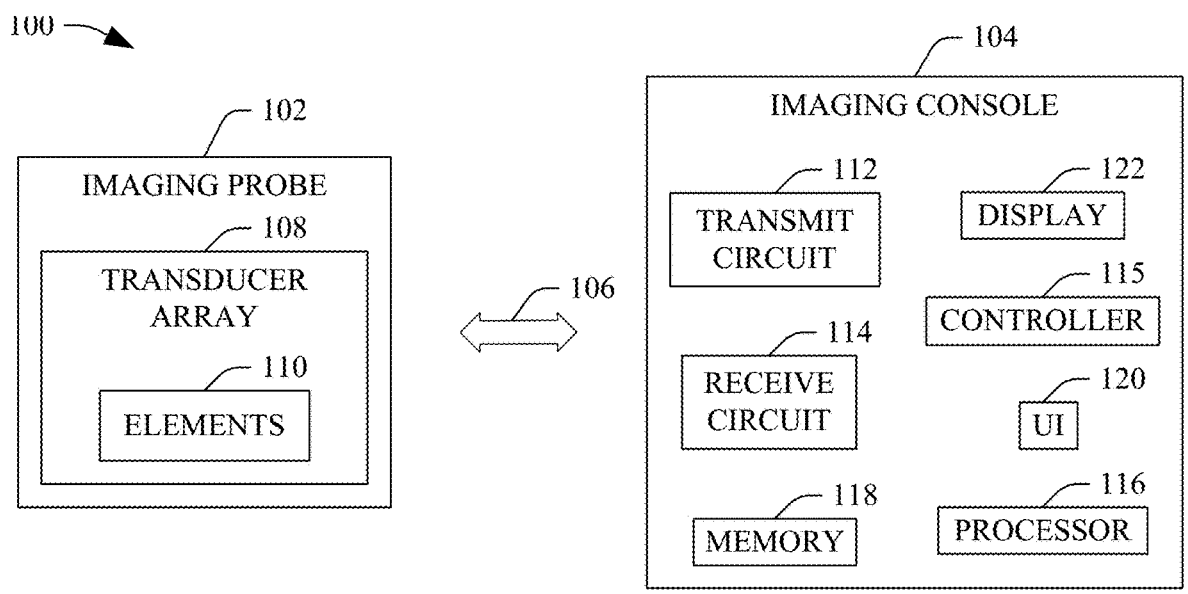
FIG. 1 schematically illustrates an example imaging system with an imaging probe and an imaging console.

FIG. 1 schematically illustrates an imaging system 100 such as ultrasound imaging system. The imaging system 100 includes an imaging probe 102 and a console 104, which are in electrical communication through a communication channel 106, which can be wired and/or wireless.

Figure 2:
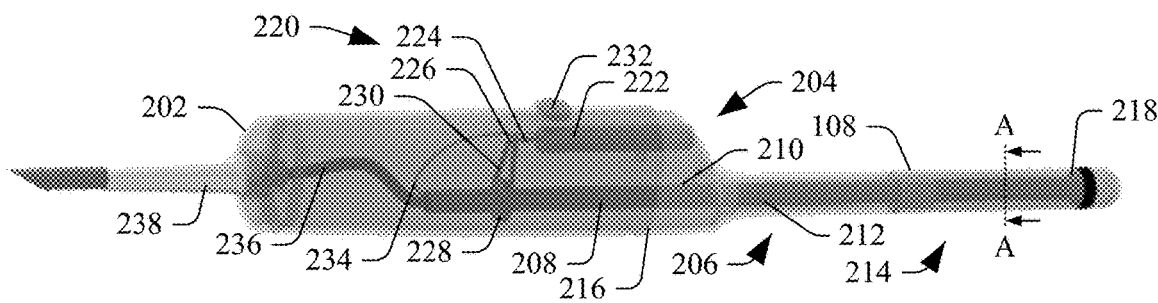
FIG. 2 schematically illustrates an example of the imaging system, which includes a circular transducer array configured to concurrently rotate and transmit and receive.
Figure 3:
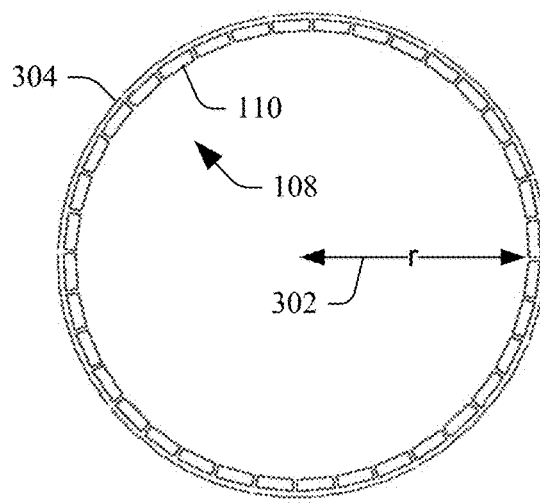
FIG. 3 schematically illustrates a cross-sectional view of the circular transducer array.

The imaging probe 102 includes a transducer array 108 with a plurality of transducer elements 110. FIG. 2 illustrates an example of the imaging probe 102, and FIG. 3 shows a cross-sectional view of the transducer array 108 along a line A-A of FIG. 2. In FIG. 2, the imaging probe 102 includes a housing 202 with a handle portion 204 and a protruding portion 206, which protrudes out from the handle portion 204. The housing 202 provides physical and mechanical support for components therein/thereon.

The imaging probe 102 further includes an elongate shaft 208 with a first side region 210 and a second side region 212. The first side region 210 is inside the handle portion 204 and the second side region 212 is inside the protruding portion 206. The transducer array 108 is disposed on an end portion 214 of the second side region 212 of the elongate shaft 208 inside the protruding portion 206. The elongate shaft 208 is rotatably supported in the housing 202, e.g., by supporting structures 216 and 218.

A drive system 220 rotates the elongate shaft 208 and hence the transducer array 108. In this example, the drive system 220 includes a motor 222 with a rotating shaft 224, a first pulley 226 connected to the rotating shaft 224, a second pulley 228 connected to the elongate shaft 208, and a belt 230 that mechanically couples the first and second pullies 226 and 228. When actuated, the motor 222 turns the rotating shaft 224, which rotates the first pulley 226, which rotates, via the belt 230, the second pulley 228, which rotates the elongate shaft 208 and hence the transducer array 108.

A control button 232 is configured to actuate the probe 102. An encoder (not visible) or the like tracks the rotational position of the transducer array 108. A wire 234 electrically connects the encoder to the transducer array 108. A set of wires 236 in the housing 202 is in electrical communication with the transducer array 108. A cable 238 routes the set of wires 236 to an electro-mechanical connector (not visible), which is configured to engage a complementary electro-mechanical connector of an ultrasound console or the like.

Turning now to FIG. 3, the transducer array 108 has a radius 302. The transducer elements 110 are arranged about a perimeter 304 of the array 108. The transducer array 108 includes M elements 110, where M is a positive integer. For explanatory purposes, the transducer array 108 is illustrated with M=36; however, M can be greater or less than thirty-six. As described in greater detail below, in fine-pitch mode, the circular transducer array 108 rotates in steps or continuously during data acquisition over two aperture revolutions to acquire overlapping apertures, each with a first pitch.

Returning to FIG. 1, the imaging console 104 includes a transmit circuit 112 that controls excitation of the elements 110 to emit ultrasound signals or pressure waves. The imaging console 104 further includes a receive circuit 114 that receives electrical signals produced by the elements 110 in response to the element 110 receiving echoes, which include scatterers produced in response to the ultrasound signals interacting with structure. In one instance, the receive circuitry 114 is configured to pre-process the received signals, e.g., by amplifying, digitizing, etc. the signals.

A controller 115 controls the drive system 220, the transmit circuit 112 and the receive circuit 114. In one instance, such control includes controlling the transmit circuit 112 and the receive circuit 114 based on the signal from the encoder of the drive system 220 to emit and receive at particular angular positions. As described in greater detail below, in the fine-pitch mode, this includes sequentially transmitting and receiving a same sequence of a sub-set of the elements 110 each aperture revolution while the transducer array 108 rotates to acquire the overlapping apertures.

A processor 116 processes the data from the receive circuit 114. Such processing includes beamforming (e.g., delay and sum) the received data from each emission into RF lines (scanlines). A memory 118 stores the RF lines. As described in greater detail below, in the fine-pitch mode, the processor 116 combines pairs of the RF lines from the different sequences, which are off-set by a predetermined angular position, to produce a set of RF lines with a second pitch, which is smaller than the first pitch at which the individual RF lines were acquired. In one instance, the combining can be considered a subtraction operation.

In the illustrated example, the processor 116 employs a synthetic aperture algorithm to combine the RF lines. An example of a synthetic aperture algorithm is described in U.S. application Ser. No. 14/763,393, U.S. Pat. No. 9,791,565 B2, filed on Jan. 13, 2013, and entitled "Multi-Faced Ultrasound Transducer Element," which is incorporated herein by reference in its entirety. Other synthetic aperture algorithms are also contemplated herein. The synthetic aperture algorithm utilized herein, in one instance, is a monostatic synthetic aperture algorithm that suppresses grating lobes.

The ultrasound imaging system 100 further includes a user interface 120 that includes an input device (e.g., a physical control, a touch-sensitive surface, etc.) and/or an output device (e.g., a display screen, etc.). The user interface 120 can be used to select a mode (e.g., the fine-pitch and/or other mode), invoke scanning, e.g. The ultrasound imaging system 100 further includes a display 122 that visually displays the data, e.g., in a graphical user interface (GUI), which allows the user to rotate, scale, and/or otherwise manipulate the displayed data, through a mouse, keyboard, or the like.

Figure 4:
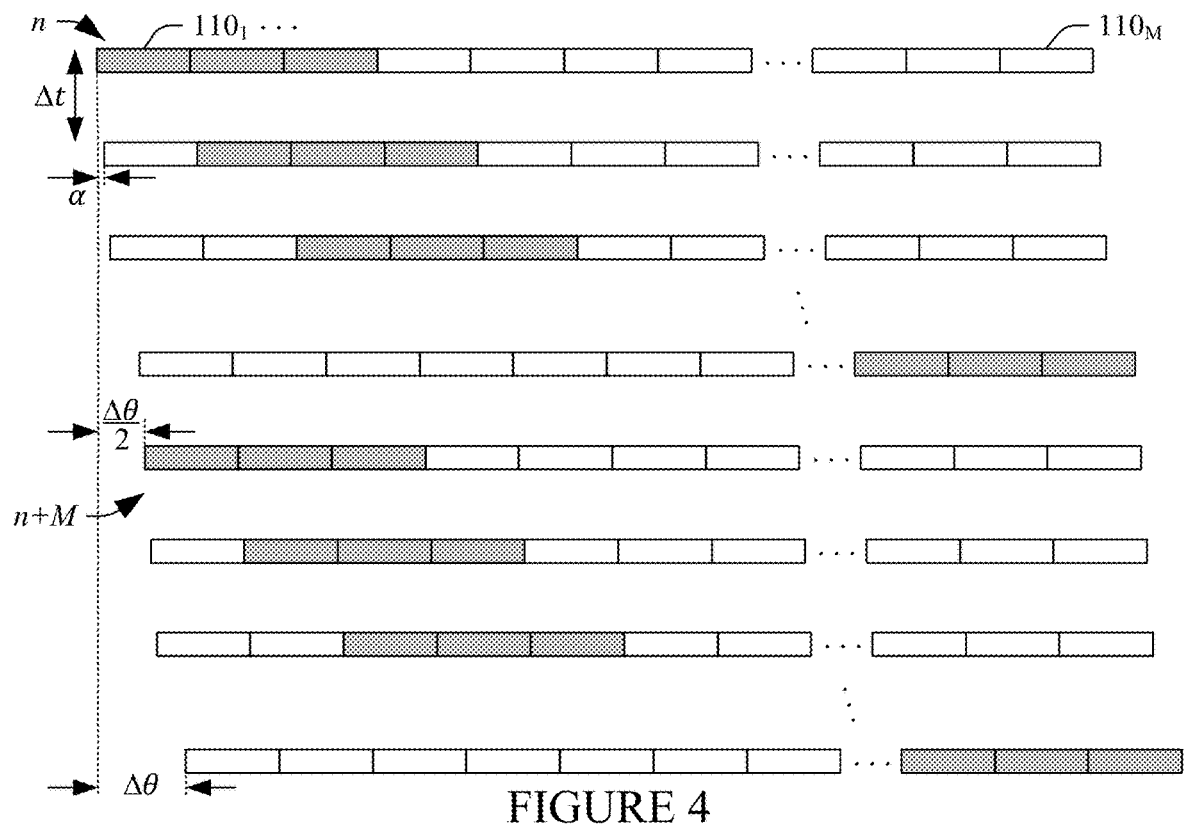
FIG. 4 schematically illustrates an example of data acquisition and processing for fine-pitch mode.

FIG. 4 schematically illustrates an example of data acquisition and processing for the fine-pitch mode.

In this example, the circular transducer array 108 is continuously rotated for two aperture revolutions. For explanatory purposes, the circular transducer array 108 is shown unwound as a linear array of M elements $110_1$-$110_M$, with each row representing a different emission sequence (with the sub-set of elements used shaded) at a different angular position of the circular transducer array 108 for two aperture revolutions, with the angular shift between emissions shown as a linear shift. The angular pitch is $\Delta\theta=2\pi/M$, the time between two emissions is $\Delta t$, and the circular transducer array 108 rotates a fraction $\alpha$ of the angular pitch $\Delta\theta$ in $\Delta t$.

The coordinates of the elements at emission number n are $(x_i(t), y_i(t))=r(\cos((i+\alpha n)\Delta\theta), \sin((i+\alpha n)\Delta\theta))$; i=0, ..., M−1, where r is the radius 302. The transmitting aperture is shifted on the rotating circular transducer array 108 by $\beta\,\Delta\theta$ in $\Delta t$. The center of the transmit aperture in emission n is given by $(x_{center}, y_{center})=r(\cos(n(\alpha+\beta)\Delta\theta), \sin(n(\alpha+\beta)\Delta\theta))$. FIG. 4 schematically illustrates an example where $\beta=1$ and $\alpha=1/(2M)$. This corresponds to a full cycle of 2(M−1) emissions in which the aperture has made two revolutions, the circular transducer array 108 has rotated by $\Delta\theta$, and the rotation between emission n and n+M is $\Delta\theta/2$. In general, the values $\alpha$ and $\beta$ can take many fractional values including negative values. If they have opposite signs, a slightly higher line density is obtained, and 2M+1 emissions are used for a full cycle.

The received RF data from each emission of each revolution is beamformed to RF lines using the angular positions of the elements 110 for the given time and stored in the memory 118. The angular positions are determined from the encoder of the drive system 220 (FIG. 2). The beamformed RF lines for the nth and (n+M)th emissions are combined to produce a single set of RF lines having a pitch that is less than the pitch of either of the individual sets of RF lines. In the illustrated example, the pitch of the combined set of RF lines is one half the pitch of the either of the individual sets of RF lines.

As a consequence, the output RF lines correspond to the output of a transducer array with twice the number of elements (2M) and half the pitch, without having to double the number of physical elements and/or transmit and/or receive channels, while mitigating grating lobes. Furthermore, the signal-to-noise ratio (SNR) will be better than that of a transducer array with twice the number of elements.

Figure 5:
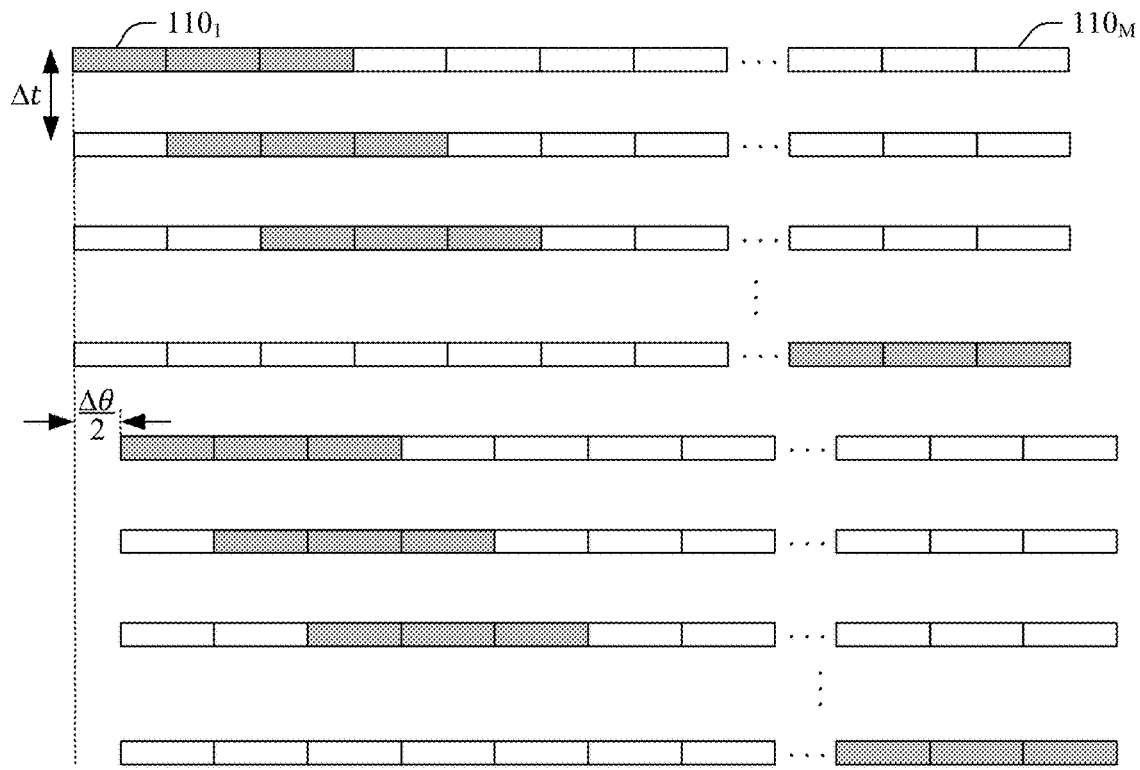
FIG. 5 schematically illustrates another example of data acquisition and processing for fine-pitch mode.

FIG. 5 schematically illustrates another example of data acquisition and processing for the fine-pitch mode. In this example, the circular transducer array 108 is rotated only once between the two aperture revolutions, and not continuously. Similarly, the rotation between the revolutions is Δθ/2 in the illustrated example.

In a variation, the circular transducer array 108 is rotated in steps between emissions of both aperture revolutions, and not continuously. Similarly, the rotation between the revolutions is Δθ/2 in the illustrated example.

In another variation, the circular transducer array 108 is rotated such that the pitch of the combined set of RF lines is less than half the acquisition pitch such as from half the acquisition pitch to one tenth of the acquisition pith or less, for example one third the acquisition pitch, one fourth the acquisition pitch, etc.

In another variation, the transducer array 108 is a linear array. In this instance, the movement would be linear and back and forth.

In another variation, the transducer array 108 is a curved (e.g., convex) array. In this instance, the movement would be along an arc and back and forth.

In another variation, a framerate is increased firing simultaneously in opposite directions.

Figure 6:
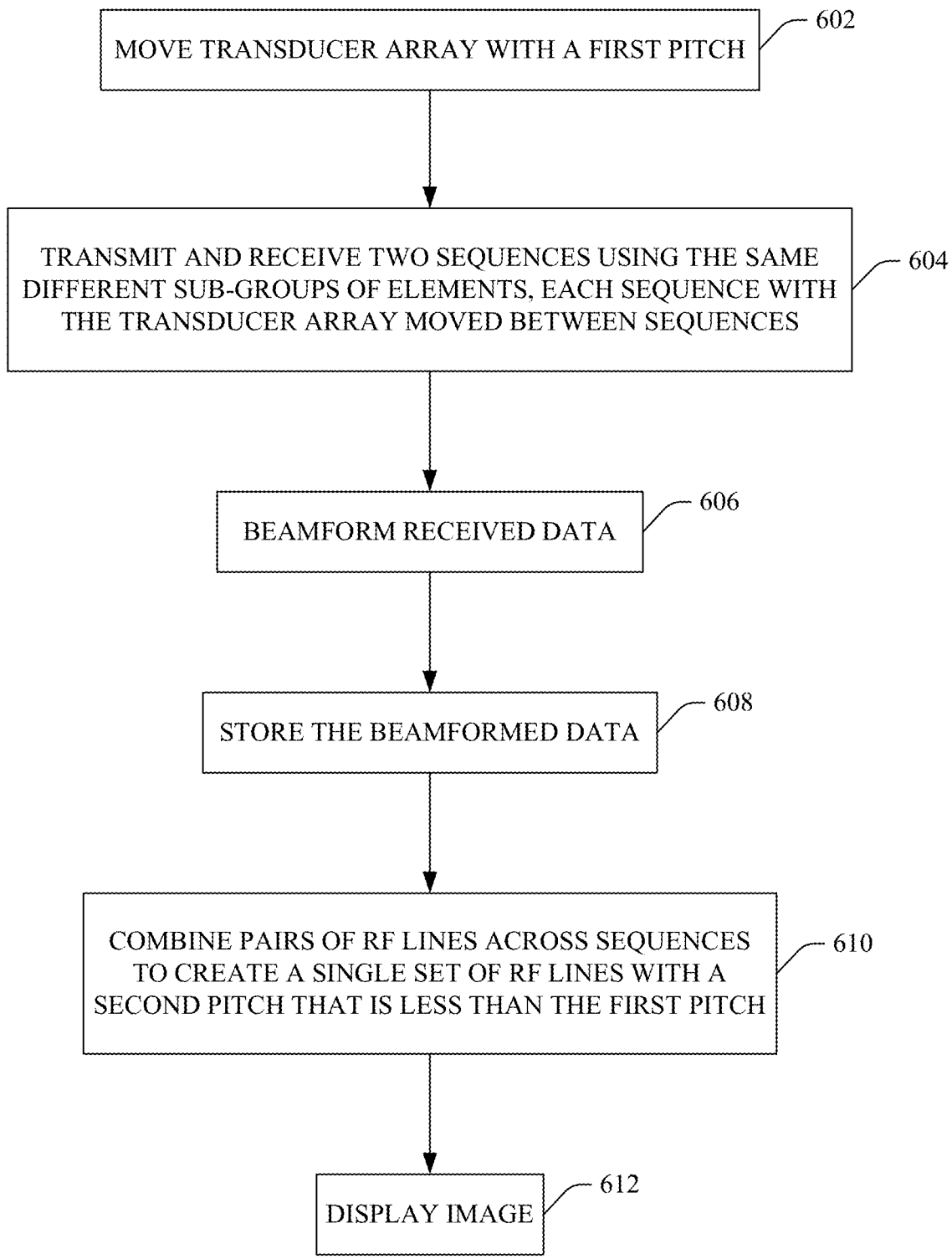
FIG. 6 illustrates an example method in accordance with an embodiment(s) described herein.

FIG. 6 illustrates a method in accordance with an embodiment(s) herein.

At 602, a transducer array is moved with a first pitch, as described herein.

At 604, two sequences of a same set of different sub-groups of the elements are sequentially excited to emit and receive, wherein the transducer array is moved at least between the two sequences, as described herein.

At 606, the received data from each sequence is beamformed to create RF lines, as described herein.

At 608, the RF lines are stored in memory, as described herein.

At 610, pairs of the RF lines across the two sequences are combined to form a single set of RF lines with a pitch that is less than the acquisition pitch.

At 612, the sets of RF lines are displayed.

The above may be implemented by way of computer readable instructions, encoded or embedded on computer readable storage medium (which excludes transitory medium) such as physical memory or other non-transitory medium, which, when executed by a computer processor(s) (e.g., a central processing unit (CPU), a microprocessor, etc.), cause the processor(s) to carry out the acts described herein. Additionally, or alternatively, at least one of the computer readable instructions is carried by a signal, carrier wave or other transitory medium.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. An ultrasound imaging system, comprising:
    an imaging probe, including:
        a transducer array with a plurality of elements; and
        a drive system configured to move the transducer array with a first pitch during data acquisition;
    a console, including:
        a transmit circuit configured to excite the plurality of elements to transmit a first sequence of different overlapping sub-sets of adjacent elements of the plurality of elements and then a second sequence of the different overlapping sub-sets of the adjacent elements, wherein the plurality of elements is offset from each other by a predetermined shift for the first and second sequences;
        a receive circuit configured to receive echo signals from the plurality of elements for the first and second sequences; and
        a processor configured to beamform the received signals for the first and second sequences and generate scanlines for the first and second sequences and configured to combine pairs of scanlines across the first and second sequences to produce a single sequence with a second pitch that is less than the first pitch.

2. The system of claim 1, wherein the second pitch is a single value from one tenth to one half of the first pitch.

3. The system of claim 1, wherein the transducer array is a circular array and the drive system is configured to continuously rotate the circular transducer array for the first and second sequences.

4. The system of claim 3, wherein the drive system is configured to rotate the transducer array at a same predetermined amount for the first and second sequences.

5. The system of claim 3, wherein the drive system is configured to rotate the transducer array in a same direction for the first and second sequences.

6. The system of claim 3, wherein the drive system is configured to rotate the transducer array in opposite directions for the first and second sequences.

7. The system of claim 1, wherein the transducer array is a circular array and the drive system rotates the circular transducer array only once and between the first and second sequences.

8. The system of claim 1, wherein the transducer array is a linear array and the movement is a linear translation.

9. The system of claim 1, wherein the transducer array is a curved array and the movement is along an arc.

10. The system of claim 1, wherein the processor is configured to employ a synthetic aperture algorithm to combine the scanlines.

11. A method, comprising:
    moving a transducer array with a plurality of elements with a first pitch during data acquisition;
    transmitting a first sequence of different overlapping sub-sets of adjacent elements of the plurality of elements and then transmitting a second sequence of the same different overlapping sub-sets of the adjacent elements, wherein the plurality of elements is offset from each other by a predetermined shift for the first and second sequences;
    receiving signals in response to the transmission sequences;
    beamforming the received signals for the first and second sequences to generate scanlines; and
    combining pairs of scanlines across the first and second sequences to produce a single sequence with a second pitch that is less than the first pitch.

12. The method of claim 11, wherein the second pitch is one half of the first pitch.

13. The method of claim 11, wherein the second pitch is one third of the first pitch.

14. The method of claim 11, wherein the second pitch is one fourth of the first pitch.

15. The method of claim 11, wherein moving the transducer array includes continuously moving the transducer array for the first and second sequences.

16. The method of claim 11, wherein moving the transducer array includes rotating the transducer array.

17. The method of claim 11, wherein moving the transducer array includes translating the transducer array.

18. The method of claim 11, wherein moving the transducer array includes moving the transducer array only once and between the first and second sequence.

19. The method of claim 11, wherein combining the scanlines includes employing a synthetic aperture algorithm to combine the scanlines.

20. A computer readable medium encoded with computer readable instruction which when executed by a processor causes the processor to:
move a transducer array with a plurality of elements with a first pitch during data acquisition;
transmit a first sequence of different overlapping sub-sets of adjacent elements of the plurality of elements, and then a second sequence of the different overlapping sub-sets of the adjacent elements, wherein the plurality of elements is offset from each other by a predetermined shift for the first and second sequences;
receive signals in response to the first and second sequences;
beamform the received signals for the first and second sequences to generate scanlines for the first and second sequences; and
combine pairs of scanlines across the first and second sequences to produce a single sequence from the first and second sequences with a second pitch that is less than the first pitch.

* * * * *